United States Patent
Kuno et al.

(10) Patent No.: US 11,149,603 B2
(45) Date of Patent: Oct. 19, 2021

(54) EXHAUST GAS PURIFICATION CATALYST AND EXHAUST GAS PURIFICATION METHOD USING THE SAME

(71) Applicant: UMICORE SHOKUBAI JAPAN CO., LTD., Tokoname (JP)

(72) Inventors: Hirotaka Kuno, Himeji (JP); Masashi Nakashima, Himeji (JP); Takahiro Ikegami, Himeji (JP); Kosuke Mikita, Himeji (JP); Masanori Ikeda, Himeji (JP); Shigekazu Minami, Himeji (JP)

(73) Assignee: UMICORE SHOKUBAI JAPAN CO., LTD., Tokoname (JP)

( * ) Notice: Subject to any disclaimer, the term of this patent is extended or adjusted under 35 U.S.C. 154(b) by 97 days.

(21) Appl. No.: 16/607,398

(22) PCT Filed: Apr. 26, 2018

(86) PCT No.: PCT/JP2018/017024
§ 371 (c)(1),
(2) Date: Oct. 23, 2019

(87) PCT Pub. No.: WO2018/199249
PCT Pub. Date: Nov. 1, 2018

(65) Prior Publication Data
US 2020/0049042 A1    Feb. 13, 2020

(30) Foreign Application Priority Data
Apr. 28, 2017 (JP) .............................. JP2017-090253

(51) Int. Cl.
*B01J 23/10* (2006.01)
*B01J 23/44* (2006.01)
(Continued)

(52) U.S. Cl.
CPC ............... *F01N 3/022* (2013.01); *B01J 23/44* (2013.01); *F01N 2370/02* (2013.01); *F01N 2510/0682* (2013.01)

(58) Field of Classification Search
CPC ......... B01J 23/10; B01J 23/44; B01J 23/464; B01J 23/63; F01N 3/022; F01N 2370/02; F01N 2510/0682; B01D 53/94
See application file for complete search history.

(56) References Cited

U.S. PATENT DOCUMENTS 4,492,769 A * 1/1985 Blanchard ................ B01J 23/89
502/262
4,621,071 A * 11/1986 Blanchard ............ B01J 37/0009
502/302
(Continued)

FOREIGN PATENT DOCUMENTS

JP    2005-505403 A    2/2005
JP    2010-005590 A    1/2010
(Continued)

OTHER PUBLICATIONS

Extended European Search Report dated Dec. 4, 2020, issued by the European Patent Office in corresponding European Application No. 18790302.6-1104, (7 pages).
(Continued)

*Primary Examiner* — Cam N. Nguyen
(74) *Attorney, Agent, or Firm* — Buchanan Ingersoll & Rooney PC

(57) ABSTRACT

In order to provide an exhaust gas purification catalyst capable of purifying hydrocarbons, carbon monoxide, and nitrogen oxides in exhaust gas at low temperatures, the exhaust gas purification catalyst according to the present invention includes: a region (2) containing palladium and yttrium on a three-dimensional structure (1), and a first region (3) and a second region (4) provided on the region (2)
(Continued)

in order from an inflow side of exhaust gas to an outflow side of exhaust gas. The concentration of yttrium contained in the first region (3) and/or the second region (4) is higher than the concentration of yttrium contained in the region (2).

15 Claims, 2 Drawing Sheets

(51) Int. Cl.
*B01J 23/46* (2006.01)
*B01J 23/63* (2006.01)
*F01N 3/022* (2006.01)
*B01D 53/94* (2006.01)

(56) References Cited

U.S. PATENT DOCUMENTS

| | | | | |
|---|---|---|---|---|
| 5,015,617 | A * | 5/1991 | Ohata | B01D 53/945 502/304 |
| 5,208,203 | A * | 5/1993 | Horiuchi | B01D 53/944 502/302 |
| 5,275,997 | A * | 1/1994 | Ganguli | B01J 23/63 502/304 |
| 6,107,239 | A * | 8/2000 | Qin | B01D 53/945 502/300 |
| 6,756,336 | B2 * | 6/2004 | Kasahara | F01N 3/0814 502/65 |
| 6,893,998 | B2 * | 5/2005 | Shigapov | B01J 23/63 502/327 |
| 7,923,407 | B2 * | 4/2011 | Goto | B01D 53/945 502/327 |
| 8,455,391 | B2 * | 6/2013 | Hanaki | B01J 35/04 502/304 |
| 8,491,847 | B2 * | 7/2013 | Kato | B01J 23/63 422/177 |
| 8,568,675 | B2 * | 10/2013 | Deeba | B01D 53/945 423/213.5 |
| 8,673,809 | B2 * | 3/2014 | Nakatsuji | B01J 21/066 502/327 |
| 8,853,120 | B2 * | 10/2014 | Aoki | B01J 35/0006 502/303 |
| 8,975,204 | B2 * | 3/2015 | Hori | B01J 23/63 502/304 |
| 9,433,927 | B2 * | 9/2016 | Ikeda | B01D 53/945 |
| 9,486,791 | B2 * | 11/2016 | Swallow | B01J 23/63 |
| 9,561,494 | B2 * | 2/2017 | Kato | B01J 23/468 |
| 9,579,633 | B2 * | 2/2017 | Suzuki | B01J 23/63 |
| 9,604,175 | B2 * | 3/2017 | Hatfield | B01J 35/04 |
| 9,643,161 | B2 * | 5/2017 | Chiffey | B01J 37/0246 |
| 9,839,902 | B2 * | 12/2017 | Suzuki | B01J 35/1014 |
| 9,931,651 | B2 * | 4/2018 | Winter | B05B 1/18 |
| 9,987,618 | B2 * | 6/2018 | Chiffey | B01J 37/0244 |
| 10,143,968 | B2 * | 12/2018 | Suzuki | C04B 35/488 |
| 10,556,223 | B2 * | 2/2020 | Suzuki | B01J 37/03 |
| 10,576,420 | B2 * | 3/2020 | Chinzei | B01J 35/002 |
| 10,773,209 | B2 * | 9/2020 | Liu | B01D 53/945 |
| 2002/0032123 | A1 * | 3/2002 | Shigapov | B01D 53/945 502/304 |
| 2003/0061860 | A1 | 4/2003 | Hu et al. | |
| 2007/0014705 | A1 | 1/2007 | Chen | |
| 2007/0219089 | A1 * | 9/2007 | Goto | B01J 23/58 502/326 |
| 2008/0016857 | A1 | 1/2008 | Hu et al. | |
| 2009/0042722 | A1 | 2/2009 | Hu et al. | |
| 2009/0232714 | A1 * | 9/2009 | Abe | B01J 23/66 422/180 |
| 2015/0343424 | A1 * | 12/2015 | Yamazaki | B01J 37/0207 423/213.2 |
| 2016/0199812 | A1 | 7/2016 | Aoki | |
| 2016/0199816 | A1 | 7/2016 | Matsueda et al. | |
| 2016/0222851 | A1 | 8/2016 | Kawabata et al. | |
| 2016/0279620 | A1 | 9/2016 | Miura et al. | |

FOREIGN PATENT DOCUMENTS

| | | |
|---|---|---|
| JP | 2012-040547 A | 3/2012 |
| JP | 2013-006179 A | 1/2013 |
| JP | 2015-039667 A | 3/2015 |
| JP | 2015-093266 A | 5/2015 |
| JP | 2017-006905 A | 1/2017 |
| WO | 2012/101505 A1 | 8/2012 |
| WO | 2013/099251 A1 | 7/2013 |
| WO | 2015/087872 A1 | 6/2015 |

OTHER PUBLICATIONS

International Search Report dated Jun. 26, 2018, by the Japanese Patent Office in corresponding International Application No. PCT/JP2018/017024. (2 pages).
Notification of Transmittal of Translation on the International Preliminary Report on Patentability (Forms PCT/IB/338, PCT/IB/373 and PCT/ISA/237) dated Oct. 29, 2019, by the International Bureau of WIPO in corresponding International Application No. PCT/JP2018/017024. (6 pages).

* cited by examiner

EXHAUST GAS PURIFICATION CATALYST AND EXHAUST GAS PURIFICATION METHOD USING THE SAME

TECHNICAL FIELD

The present invention relates to an exhaust gas purification catalyst and an exhaust gas purification method using such an exhaust gas purification catalyst and more specifically relates to an exhaust gas purification catalyst capable of purifying hydrocarbons (HC), carbon monoxide (CO), and nitrogen oxides (NOx) in exhaust gas at low temperatures and an exhaust gas purification method using such an exhaust gas purification catalyst.

BACKGROUND OF THE INVENTION

Numerous exhaust gas purification methods have been proposed in which hydrocarbons (HC), carbon monoxide (CO), and nitrogen oxides (NOx) are removed simultaneously from exhaust gas.

For example, technology has been proposed in which a catalyst component is overlap-coated onto a catalyst support and the concentration of precious metals contained in this overlapping part is changed, thereby even when the poisoning components contained in exhaust gas adhere to the catalyst, a fixed amount of the catalytically active component is protected from the poisoning material, and thus a reduction in the activity of the catalyst due to the catalytically active component becoming poisoned does not occur (Patent Document 1). Furthermore, in order to improve the contact efficiency between the oxygen storage component contained in the catalyst and the exhaust gas, a technique for overlap-coating the catalyst has been proposed (Patent Document 2). Technology has also been proposed for the purpose of purifying HC and NOx in exhaust gas by overlap-coating the catalyst component in consideration of the effect of each of the precious metals of Pt, Pd, and Rh and by dividing the regions where the Pt and Pd, which are contained in portions directly covered by the support, are present (Patent Document 3).

However, exhaust gas regulations are becoming increasingly strict with the passage of time, and known exhaust gas purification catalysts cannot sufficiently satisfy the stricter regulations. In particular, currently, the performance of rhodium, which is effective in reducing NOx, cannot be fully utilized. For example, when exhaust gas contacts the catalyst, the concentrations of oxygen and components to be purified such as NOx are changed, thereby the purification (treatment) amount of components to be purified varies from the exhaust gas inlet side to the outlet side, and thus it is difficult to sufficiently clean the exhaust gas. More specifically, for example, when an automobile transitions from an idling state to a traveling state, a large amount of high-temperature exhaust gas is instantaneously produced and is introduced into the exhaust gas purification catalyst. However, the temperature of the exhaust gas purification catalyst is lower than that of the exhaust gas. Therefore, it is difficult to immediately purify exhaust gas with known exhaust gas purification catalysts. That is, known exhaust gas purification catalysts have low catalytic responsiveness to exhaust gas.

CITATION LIST

Patent Literature

Patent Document 1: JP 2013-6179 A
Patent Document 2: JP 2005-505403 A
Patent Document 3: JP 2010-5590 A

SUMMARY OF THE INVENTION

Technical Problem

The technologies disclosed in Patent Documents 1 to 3 are limited to merely purifying the HC and NOx in exhaust gas and are not sufficient for application when the temperature of the exhaust gas is low.

The present invention was conceived in view of the problems described above, and an object of the present invention is to provide an exhaust gas purification catalyst capable of efficiently purifying HC, CO, and NOx in exhaust gas discharged at low temperatures at which it is difficult for the catalyst to act sufficiently and to provide an exhaust gas purification method using such an exhaust gas purification catalyst. The exhaust gas purification catalyst and the exhaust gas purification method using such an exhaust gas purification catalyst according to the present invention can purify NOx at low temperatures. In particular, an object of the present invention is to provide a purification catalyst with excellent responsiveness and an exhaust gas purification method using such an exhaust gas purification catalyst, which are capable of treating large amounts of high-temperature exhaust gas even when conditions change from a state in which a small amount of low-temperature exhaust gas is being introduced to a state in which a large amount of high-temperature exhaust gas is instantaneously introduced, that is, not only when the temperature of the exhaust gas suddenly rises, but also when the space velocity with respect to the catalyst (capacity (h-1) per unit time of exhaust gas passing through a catalyst of a unit volume) has suddenly increased. Furthermore, the exhaust gas purification catalyst according to the present invention is a catalyst that exhibits durability and can purify NOx for a long period of time.

Solution to Problem

As a result of diligent research to solve the problems described above, the present inventors discovered the below-described exhaust gas purification catalyst and thereby arrived at the completion of the present invention.

That is, the exhaust gas purification catalyst of the present invention includes: a region containing palladium and yttrium, the region being provided on a three-dimensional structure; and a first region and a second region being provided on the region containing palladium and yttrium in order from an inflow side of exhaust gas to an outflow side of exhaust gas, wherein the concentration of yttrium contained in either the first region and/or the second region is higher than the concentration of yttrium contained in the region containing palladium and yttrium.

Advantageous Effects of Invention

According to the present invention, an exhaust gas purification catalyst capable of efficiently purifying hydrocarbons (HC), carbon monoxide (CO), and nitrogen oxides (NOx) in exhaust gas discharged at low temperatures at which it is difficult for the catalyst to act sufficiently and an exhaust gas purification method using such an exhaust gas purification catalyst can be provided.

DESCRIPTION OF EMBODIMENTS

Figure 1:
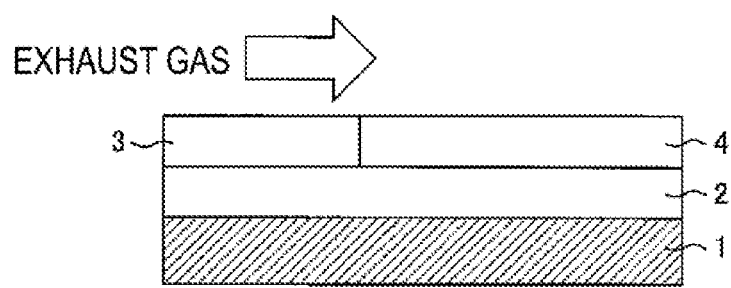
FIG. 1 is a cross section view illustrating a schematic configuration of an exhaust gas purification catalyst according to an embodiment (Example 1).

Embodiments of the present invention will be described in detail below. However, the present invention is not limited thereto, various modifications are possible within the scope described, and embodiments obtained by appropriately combining technical means disclosed in the different embodiments are also included in the technical scope of the present invention. Note that, unless otherwise indicated herein, "from A to B" representing a numerical range of "from A or more to B or less." Furthermore, when there are characteristics related to mass or physical properties with respect to each element, a separate conversion formula, substance name, and the like will be given.

An exhaust gas purification catalyst (hereinafter, may be described merely as "catalyst") according to an embodiment of the present invention includes: a region containing palladium and yttrium, the region being provided on a three-dimensional structure (hereinafter, may be described merely as a "region containing palladium and yttrium); and a first region and a second region being provided on the region containing palladium and yttrium in order from an inflow side of exhaust gas to an outflow side of exhaust gas, and the concentration of yttrium contained in either the first region and/or the second region is higher than the concentration of yttrium contained in the region containing palladium and yttrium. Furthermore, (i) the amount of yttrium contained in the second region is more preferably larger than the amount of yttrium contained in the first region, and (ii) the second region and the region containing palladium and yttrium contain a yttrium-containing complex oxide, and a yttrium-containing complex oxide (2) contained in the second region more preferably has a higher yttrium content than that of a yttrium-containing complex oxide (3) in the region containing palladium and yttrium. In addition, the exhaust gas purification method according to an embodiment of the present invention uses the exhaust gas purification catalyst to purify exhaust gas.

Three-Dimensional Structure

Although the three-dimensional structure used in an embodiment of the present invention is not particularly limited as long as it is a three-dimensional structure that can support a catalyst on the surface thereof, the three-dimensional structure is preferably a structure having a shape that is normally used as a catalyst support such as a flow-through honeycomb, plug honeycomb, corrugated honeycomb, plate, or wave-plate, and a flow-through honeycomb shaped structure is more preferable. The material of the three-dimensional structure is not particularly limited as long as the material has heat resistance, and iron-based metals such as stainless steel; and ceramics such as cordierite, SiC, and alumina can be suitably used.

Three-dimensional structures are commercially available as three-dimensional structures for exhaust gas purification, and such structures can be used. A desirable size and shape of the three-dimensional structure can be appropriately selected according to the amount of exhaust gas to be treated.

The length of the three-dimensional structure is not greater than, 200 mm, preferably not greater than 160 mm, more preferably not greater than 120 mm, and most preferably not greater than 100 mm and is not less than 30 mm, preferably not less than 50 mm, even more preferably not less than 60 mm, and most preferably not less than 70 mm.

An appropriate diameter of the cross-section of the three-dimensional structure is not less than 60 mm and preferably not less than 70 mm and is not greater than 120 mm, and preferably not greater than 100 mm.

The volume of the three-dimensional structure is not less than 0.4 liters (hereinafter, may be referred to as "L"), preferably not less than 0.5 L, and more preferably not less than 0.6 L and is also not greater than 2.0 L, preferably not greater than 1.6 L, and even more preferably not greater than 1.4 L.

When the three-dimensional structure has holes, the shape of the holes may be any shape such as triangular, square, hexagonal, or circular but is preferably a square or hexagonal shape. The number of holes is preferably from 15 holes/cm' to 190 holes/cm' and more preferably from 60 holes/cm' to 140 holes/cm'.

Region Containing Palladium and Yttrium

A region containing palladium and yttrium is provided on the three-dimensional structure. The region containing palladium and yttrium need only include at least palladium and yttrium. The amount of palladium contained in the region is, in terms of metal, not less than 0.1 g/L (hereinafter, the amount of each component per liter of the three-dimensional structure may be described as "g/L"), more preferably not less than 0.2 g/L, even more preferably not less than 0.4 g/L, and most preferably not less than 2 g/L relative to the three-dimensional structure. When the amount of palladium is less than 0.1 g/L, the reaction sites in the three-dimensional structure are insufficient. Moreover, the amount of palladium contained in the region is, in terms of metal, not greater than 20 g/L, more preferably not greater than 15 g/L, even more preferably not greater than 10 g/L, and most preferably not greater than 5 g/L relative to the three-dimensional structure. When the amount of palladium exceeds 20 g/L, the reaction efficiency decreases.

The concentration of palladium contained in the region is preferably not less than 1 mass % and more preferably not less than 3 mass % and is preferably not greater than 10 mass % and more preferably not greater than 8 mass %. "Concentration" in the present specification is the percentage (%) of the mass of each component relative to the mass of the total of all components contained in the region of interest. Hereinafter, the description of "concentration" is the same for each component in the other regions. Note that palladium, rhodium, and platinum are expressed in terms of metal, and other components are expressed in terms of oxide, respectively.

Platinum and rhodium may be contained in the region, as necessary, but the amounts of platinum and rhodium are preferably small in order to emphasize the effect of palladium.

Nitrates, chloride salts, and the like can be used as raw materials for palladium, platinum, and rhodium (collectively described as "precious metals"), and nitrates are more preferable.

The amount of yttrium contained in the region containing palladium and yttrium is, in terms of $Y_2O_3$, not less than 0.01 g/L and more preferably not less than 0.05 g/L relative to 1 liter of the three-dimensional structure. When the amount of yttrium is less than 0.01 g/L, the heat resistance of the region is insufficient. Furthermore, the amount of yttrium is, in terms of $Y_2O_3$, not greater than 0.7 g/L and more preferably not greater than 0.6 g/L relative to the three-dimensional structure. When the amount of yttrium exceeds 0.7 g/L, the dispersibility of the yttrium is insufficient.

The concentration of yttrium contained in the region containing palladium and yttrium is not less than 0.01 mass %, more preferably not less than 0.1 mass %, and even more preferably not less than 0.3 mass % and is also less than 2 mass %, more preferably not greater than 0.9 mass %, and even more preferably not greater than 0.7 mass %. When the concentration of yttrium is less than 0.01 mass %, the heat resistance of the region is insufficient. When the concentration of yttrium exceeds 7 mass %, the dispersion efficiency of the yttrium will be low, and the effect from the addition of yttrium will be difficult to obtain.

As the yttrium contained in the region, yttrium oxide can be used, and the yttrium oxide is more preferably a complex oxide with a metal other than yttrium, a rare earth metal (except yttrium, the same hereinafter), zirconium oxide, aluminum oxide, and the like. The content of yttrium in the yttrium complex oxide (3) contained in the region is, in terms of $Y_2O_3$, not less than 0.01 mass % and more preferably not less than 0.1 mass % and is also not greater than 7 mass % and more preferably not greater than 5 mass %.

The length of the region is preferably not less than 50%, more preferably not less than 60%, even more preferably not less than 70%, and most preferably not less than 80% and is preferably not greater than 85%, more preferably not greater than 90%, even more preferably not greater than 95%, and most preferably not greater than 100% of the length of the three-dimensional structure.

Examples of components other than the precious metals and yttrium contained in the region include components that are ordinarily used in catalysts including alumina such as α-alumina, γ-alumina, and θ-alumina; silica, titania, zirconia, or mixtures thereof and refractory inorganic oxides such as complex oxides thereof; alkali metal oxides; Mg; alkaline earth metal oxides; oxides of rare earth metals such as Pr, Ce, and Nd; and transition metal oxides. Among the above exemplary components, an oxygen storage material (for example, cerium oxide) which is capable of storing oxygen and that is a refractory inorganic oxide or a metal oxide is more preferable. A commercially available oxide can be appropriately used as the oxide described above.

Among the rare earth elements, when cerium is used, an oxide of cerium can interact as an oxygen storage material with palladium to improve the NOx purification performance at low temperatures. The amount of cerium oxide contained in the region is, in terms of $CeO_2$, not less than 2 g/L, more preferably not less than 5 g/L, and even more preferably not less than 7 g/L relative to 1 liter of the three-dimensional structure. When the amount of cerium oxide is less than 2 g/L, the amount of oxygen storage is insufficient. Furthermore, the amount of cerium oxide is, in terms of $CeO_2$, not greater than 50 g/L and more preferably not greater than 20 g/L relative to the three-dimensional structure. When the amount of cerium oxide exceeds 50 g/L, the heat resistance of the region is insufficient. Cerium oxide can be used as a complex oxide complexed with another metal oxide, for example, aluminum oxide and/or zirconium oxide. The total amount of other metal oxides contained in the complex oxide is, in terms of aluminum oxide, not less than 10 mass % and preferably not less than 15 mass % and is not greater than 50 mass % and preferably not greater than 45 mass %.

The amount of the refractory inorganic oxide used in the region is not less than 5 g/L, more preferably not less than 7 g/L, and even more preferably not less than 10 g/L and is not greater than 100 g/L, more preferably not greater than 80 g/L, and even more preferably not greater than 70 g/L relative to 1 liter of the three-dimensional structure. The amount of the alkaline earth metal oxide used in the region is not less than 1 g/L and more preferably not less than 5 g/L and is also not greater than 25 g/L and more preferably not greater than 15 g/L relative to the three-dimensional structure. The amount of the rare earth metal oxide, excluding cerium, used in the region is not less than 1 g/L and more preferably not less than 5 g/L and is also not greater than 25 g/L and more preferably not greater than 15 g/L relative to the three-dimensional structure. The amount of the transition metal oxide used in the region is not less than 1 g/L and more preferably not less than 5 g/L and is also not greater than 25 g/L and more preferably not greater than 15 g/L relative to the three-dimensional structure.

In particular, the amount of zirconium oxide used in the region is not less than 5 g/L and more preferably not less than 10 g/L relative to 1 liter of the three-dimensional structure. When the amount of zirconium oxide is less than 5 g/L, the heat resistance of the region is insufficient. In addition, the amount of zirconium oxide is not greater than 50 g/L, more preferably not greater than 30 g/L, and even more preferably not greater than 20 g/L relative to the three-dimensional structure. When the amount of zirconium oxide exceeds 50 g/L, the concentration of the other components decreases, and thus the effect of the other components tends to be reduced.

The amount of all components provided in the region containing palladium and yttrium is not less than 10 g/L, preferably not less than 40 g/L, more preferably not less than 70 g/L, even more preferably not less than 80 g/L, and most preferably not less than 90 g/L and is also not greater than 200 g/L, preferably not greater than 150 g/L, and more preferably not greater than 100 g/L relative to 1 liter (L) of the three-dimensional structure.

First Region

The first region is provided on the region containing palladium and yttrium at the inflow side of exhaust gas. The first region preferably contains yttrium. The amount of yttrium contained in the first region may be 0 g/L, but in a case where the first region is relatively long or a case where the concentration of the exhaust gas is high, heat resistance is required in the first region, and therefore the first region desirably contains yttrium. In this case, the amount of yttrium contained in the first region may be, in terms of $Y_2O_3$, 0 g/L or an amount exceeding 0 g/L relative to 1 liter of the three-dimensional structure. Furthermore, the amount of yttrium is, in terms of $Y_2O_3$, not greater than 2 g/L and more preferably less than 1 g/L relative to the three-dimensional structure. Note that even when an amount of yttrium that exceeds 10 g/L is added, an effect proportionate to the added amount is not easily obtained.

Additionally, if the heat generated by the combustion of the exhaust gas is low, the concentration of yttrium contained in the first region may be 0 mass %. On the other hand, if the heat generated by the combustion of the exhaust gas is high, heat resistance is required in the first region, and therefore, the first region preferably contains yttrium. In order to provide favorable heat resistance, the concentration of yttrium contained in the first region may be 0 mass % or greater than 0 mass % and is also not greater than 8 mass %, preferably less than 4 mass %, even more preferably less than 0.1 mass %, and most preferably less than 0.01 mass %. When the concentration of yttrium exceeds 8 mass %, it will be difficult to obtain heat resistance proportionate to the added amount of yttrium.

Yttrium oxide can be used as the yttrium contained in the first region, and the yttrium contained in the first region is more preferably a complex oxide with a metal other than yttrium. Specific examples include complex oxides of yttrium and rare earth elements (excluding yttrium), zirconium, or cerium. The content of yttrium in the yttrium complex oxide (1) contained in the first region is, in terms of $Y_2O_3$, not less than 0.5 mass % and more preferably not less than 1 mass % and is also not greater than 15 mass % and more preferably not greater than 3 mass %.

Examples of components other than yttrium contained in the first region include components that are ordinarily used in catalysts including alumina such as α-alumina, γ-alumina, and θ-alumina; silica, titania, zirconia, mixtures thereof, or refractory inorganic oxides such as complex oxides thereof; alkali metal oxides; alkaline earth metal oxides; rare earth metal oxides; and transition metal oxides. Among the above exemplary components, an oxygen storage material (for example, cerium oxide) which is capable of storing oxygen and that is a refractory inorganic oxide or metal oxide is more preferable, and γ-alumina, θ-alumina, zirconia, and cerium oxide are even more preferable. The total amount of the oxide used in the first region is not less than 10 g/L and more preferably not less than 20 g/L and is also not greater than 60 g/L, more preferably not greater than 40 g/L, and even more preferably 35 g/L relative to 1 liter of the three-dimensional structure.

Using the inflow side of exhaust gas as a starting point, the length of the first region is preferably not less than 20 mm, more preferably not less than 25 mm, and even more preferably not less than 30 mm. When the length of the first region is shorter than 20 mm, precious metal is not sufficiently present at the inflow side of exhaust gas, and thus the purification rate of the exhaust gas will be low. Furthermore, using the inflow side of exhaust gas as a starting point, the length of the first region is preferably not greater than 50 mm, more preferably not greater than 40 mm, and even more preferably not greater than 35 mm. When the length of the first region is longer than 50 mm, precious metal is not sufficiently supported at the inflow side of exhaust gas, and thus the purification rate of the exhaust gas will be low.

Here, the length of each of the regions is an average value of "$(L_{min}+L_{max})\div 2$" of the shortest value $L_{min}$ and the longest value L. of the internal length of a region when the completed catalyst or the three-dimensional structure is divided where each of the regions are coated.

As an example of a method for confirming the coating state (coating length, coating thickness, and coating amount) of each of the below-described slurries on the three-dimensional structure, for a catalyst that was formed by applying each slurry under several coating conditions in advance, a method of breaking the catalyst and measuring the above-mentioned length, thickness, and amount by using calipers, an electronic scale, and a three-dimensional (3D) microscope or other microscope can be used. Moreover, an X-ray CT device may also be used to measure the length, thickness, and amount described above without breaking the catalyst. A suitable catalyst can be easily produced by applying each of the slurries described below under application conditions that confirm that the slurry is applied to the desired length, thickness, and amount.

In particular, the amount of zirconium oxide used in the first region is not less than 2 g/L, more preferably not less than 3 g/L, and even more preferably not less than 5 g/L relative to 1 liter of the three-dimensional structure. When the amount of zirconium oxide is less than 2 g/L, the heat resistance of the first region is insufficient. In addition, the amount of zirconium oxide is not greater than 50 g/L, more preferably not greater than 30 g/L, and even more preferably not greater than 20 g/L relative to 1 liter of the three-dimensional structure. When the amount of zirconium oxide exceeds 50 g/L, the concentration of the other components becomes diluted, and thus the effect of the other components tends to be reduced.

The first region may further contain a precious metal such as platinum, palladium, and rhodium. Platinum and rhodium are more preferable as the precious metal, and rhodium is even more preferable. The amount of platinum or palladium used in the first region may be substantially 0 g/L, which is an amount such that platinum or palladium does not produce an effect depending on the state of the exhaust gas, and the amount of platinum or palladium may be respectively, in terms of metal, greater than 0 g/L, preferably not less than 0.01 g/L, more preferably not less than 0.02 g/L and is not greater than 12 g/L and more preferably not greater than 10 g/L relative to 1 liter of the three-dimensional structure depending on the state of the exhaust gas. The concentration of rhodium used in the first region is not less than 0.3 mass %, preferably not less than 0.9 mass %, and more preferably not less than 1.5 mass % and is not greater than 5 mass %, preferably not greater than 3 mass %, and more preferably not greater than 2.5 mass %. The amount of rhodium used in the first region is, in terms of metal, not less than 0.1 g/L, more preferably not less than 0.2 g/L, even more preferably not less than 0.4 g/L, and most preferably not less than 0.5 g/L and is also not greater than 1.2 g/L, more preferably not greater than 1.0 g/L, and even more preferably not greater than 0.8 g/L relative to 1 liter of the three-dimensional structure.

The amount of all components provided in the first region is not less than 21 g/L and preferably not less than 25 g/L and also not greater than 60 g/L, preferably less than 45 g/L, more preferably less than 40 g/L, and even more preferably not greater than 35 g/L relative to 1 liter (L) of the three-dimensional structure.

Second Region

The second region is provided on the region containing palladium and yttrium at the outflow side of exhaust gas. Preferably, the second region is provided on the region containing palladium and yttrium at a portion where the first region is not provided at the outflow side of exhaust gas. The second region preferably contains yttrium. The amount of yttrium contained in the second region may be 0 g/L, but in order for the second region to have favorable heat resistance, the second region preferably contains yttrium. In this case, the amount of yttrium contained in the second region is, in terms of $Y_2O_3$, not less than 0 g/L, preferably not less than 1 g/L, more preferably not less than 2.1 g/L, and even more preferably not less than 2.5 g/L relative to 1 liter of the three-dimensional structure. Furthermore, the amount of yttrium is, in terms of $Y_2O_3$, not greater than 10 g/L and more preferably not greater than 5 g/L relative to the three-dimensional structure. When the amount of yttrium exceeds 10 g/L, the dispersibility of the yttrium is insufficient.

Additionally, the influence of heat generated by the combustion of exhaust gas becomes greater in the second region than in the first region, and thus the concentration of yttrium contained in the second region may be 0 mass % when the target exhaust gas does not require heat resistance of the catalyst. When the target exhaust gas that requires heat resistance of the catalyst, the concentration of yttrium contained in the second region is not less than 0.1 mass %, preferably not less than 1 mass %, more preferably not less than 2 mass %, even more preferably not less than 3 mass %, and most preferably not less than 4 mass % and is not greater than 15 mass %, preferably not greater than 10 mass %, and more preferably not greater than 9 mass %. When the concentration of yttrium exceeds 15 mass %, it will be difficult to obtain heat resistance proportionate to the added amount of yttrium.

Yttrium oxide can be used as the yttrium contained in the second region, the yttrium contained in the second region is more preferably a complex oxide with a metal other than yttrium, and examples include complex oxides with rare earth elements (excluding yttrium), zirconium, or cerium. The content of yttrium in the yttrium complex oxide (2) contained in the second region is, in terms of $Y_2O_3$, not less than 8 mass % and more preferably not less than 10 mass % and is also not greater than 20 mass % and more preferably not greater than 17 mass %.

The length of the second region is preferably a length from the end of the outflow side of exhaust gas of the first region to the end of the outflow side of exhaust gas of the three-dimensional structure.

Examples of components other than yttrium contained in the second region include components that are ordinarily used in catalysts including alumina such as α-alumina, γ-alumina, and θ-alumina; silica, titania, zirconia, mixtures thereof, or refractory inorganic oxides such as complex oxides thereof; alkali metal oxides; alkaline earth metal oxides; rare earth metal oxides; and transition metal oxides. Among the above exemplary components, an oxygen storage material (for example, cerium oxide) which is capable of storing oxygen and that is a refractory inorganic oxide or metal oxide is more preferable, and γ-alumina, θ-alumina, zirconia, and cerium oxide are even more preferable. The total amount of the abovementioned oxide used in the second region is not less than 20 g/L and more preferably not less than 25 g/L and is also not greater than 150 g/L and more preferably not greater than 120 g/L relative to 1 liter of the three-dimensional structure.

In particular, the amount of zirconium oxide used in the second region is not less than 1 g/L, more preferably not less than 3 g/L, and even more preferably not less than 4 g/L relative to 1 liter of the three-dimensional structure. When the amount of zirconium oxide is less than 1 g/L, the heat resistance of the second region is insufficient. In addition, the amount of zirconium oxide is not greater than 50 g/L, more preferably not greater than 30 g/L, and even more preferably not greater than 17 g/L relative to the three-dimensional structure. When the amount of zirconium oxide exceeds 50 g/L, the concentration of the other components becomes diluted, and thus the effect of the other components tends to be reduced.

The second region may further contain a precious metal such as platinum, palladium, or rhodium. Platinum and rhodium are more preferable as the precious metal, and rhodium is even more preferable. The amount of platinum or palladium used in the second region may be substantially 0 g/L, which is an amount such that platinum or palladium does not produce an effect depending on the state of the exhaust gas, and the amount of platinum or palladium may be respectively, in terms of metal, greater than 0 g/L, preferably not less than 0.01 g/L, and more preferably not less than 0.02 g/L and is less than 0.8 g, more preferably less than 0.45 g/L, and even more preferably less than 0.3 g/L relative to 1 liter of the three-dimensional structure depending on the state of the exhaust gas. The concentration of rhodium contained in the second region is not less than 0.1 mass %, preferably not less than 0.3 mass %, and more preferably not less than 0.4 mass % and is also not greater than 0.8 mass %, preferably not greater than 0.7 mass %, and more preferably not greater than 0.6 mass %. The amount of rhodium used in the second region is, in terms of metal, not less than 0.1 g/L and more preferably not less than 0.2 g/L and is also not greater than 1.2 g/L, more preferably not greater than 1.0 g/L, even more preferably not greater than 0.5 g/L, less than 0.4 g/L, and not greater than 0.35 g/L relative to 1 liter of the three-dimensional structure.

The amount of all components provided in the second region is not less than 21 g/L, preferably not less than 40 g/L, more preferably not less than 45 g/L and is also less than 70 g/L, preferably not greater than 60 g/L, and even more preferably not greater than 55 g/L relative to 1 liter (L) of the three-dimensional structure.

Comparison of Yttrium Concentrations and Amounts Between Regions

In the exhaust gas purification catalyst according to an embodiment of the present invention, the concentration of yttrium contained in either the first region and/or the second region is higher than the concentration of yttrium contained in the region containing palladium and yttrium. Setting the concentration of yttrium contained in the first region and/or the second region to a high level further improves the heat resistance of the exhaust gas purification catalyst. Preferably, the concentration of yttrium is higher in the second region than in the region containing palladium and yttrium. Furthermore, the amount of yttrium contained in the second region is more preferably larger than the amount of yttrium contained in the first region. The concentration of yttrium contained in each region refers to the percentage of the mass of yttrium (in terms of $Y_2O_3$) relative to the total mass of the yttrium (in terms of $Y_2O_3$) and the components other than yttrium in each region (mass of compounds contained in each region). When the concentration of yttrium contained in either the first region and/or the second region is lower than the concentration of yttrium contained in the region containing palladium and yttrium, the catalyst is prone to deterioration due to heat generated by the combustion of the exhaust gas.

Additionally, the yttrium is more preferably a complex oxide of yttrium and a metal other than yttrium. Specifically, a mixture of yttrium oxide and zirconium oxide, a solid solution in which yttrium is dissolved in zirconium oxide, or a complex oxide formed from yttrium and zirconium is even more preferable. In the present specification, a composite oxide containing yttrium is referred to as an yttrium-containing complex oxide.

The yttrium-containing complex oxide contained in the first region and/or the second region (the yttrium complex oxide (1) and/or the yttrium complex oxide (2)) more preferably has a higher yttrium content than that of the yttrium-containing complex oxide (3) contained in the region containing palladium and yttrium, and even more preferably, the yttrium-containing complex oxide (2) contained in the second region has a higher yttrium content than that of the yttrium complex oxide (3) contained in the region containing the palladium and yttrium.

Use of the exhaust gas purification catalyst according to the embodiment of the present invention described above allows the exhaust gas to be efficiently purified even when the temperature of the exhaust gas is low and when the space velocity is high. Here, "low temperature" indicates that the temperature of the exhaust gas at the end portion of the side of the three-dimensional structure where the exhaust gas inflows is from 100° C. to 400° C., and "space velocity is high" refers to a velocity of not less than 80000 $h^{-1}$.

Rhodium Concentration Comparison Between Regions

With the exhaust gas purification catalyst according to an embodiment of the present invention, the concentration of rhodium contained in the first region is preferably higher than the concentration of rhodium contained in the second region. The concentration of rhodium contained in each region refers to the percentage of the mass of rhodium (in terms of metal) relative to the total mass of the rhodium and the components other than rhodium in each region. When the concentration of rhodium contained in the first region is lower than the concentration of rhodium contained in the second region, the light-off characteristics of the catalyst at low temperatures diminish. Note that the light-off characteristics are characteristics expressed by the time (light-off time) at which the purification rate of the catalyst with regard to HC, CO, and NOx reaches 50% (T50) with respect to exhaust gas at a specific temperature.

Comparison of Amounts of All Provided Components Between Regions

The amount of all components provided in each region is not particularly limited as long as the amount improves catalytic activity. (1) Preferably, the amount of all components provided in the second region is equal or greater than that of the first region and is preferably a greater than that of the first region. (2) Furthermore, the amount of all components provided in each region is such that the amount in the region containing palladium and yttrium is larger than the amount in either the first region or the second region, and preferably the amount in the region containing palladium and yttrium is larger than the amount in both the first region and the amount in the second region. (3) More preferably, the amount of all components provided in each region is such that the amount in the region containing palladium and yttrium is larger than the amount in the second region, and the amount in the second region is larger than the amount in the first region. Note that the amount of all components provided in each region can be appropriately selected from the amount of each component provided in each of the regions described above.

Method for Preparing the Exhaust Gas Purification Catalyst

The method for preparing an exhaust gas purification catalyst according to an embodiment of the present invention is not particularly limited as long as it is a known preparation method used to prepare an exhaust gas purification catalyst, but an example of a more preferable preparation method will be described in detail below.

Examples of the method for preparing the exhaust gas purification catalyst include (1) a method in which a slurry a for forming a region containing palladium and yttrium, a slurry b for forming a first region, and a slurry c for forming a second region are prepared, the slurry a is brought into contact with a three-dimensional structure, after which the excess slurry is removed and the three-dimensional structure is dried or calcined, subsequently the slurry b is brought into contact with a portion that becomes the first region on the region containing palladium and yttrium, after which the excess slurry is removed and the three-dimensional structure is dried or calcined, and subsequently the slurry c is brought into contact with a portion that becomes the second region on the region containing the palladium and yttrium, after which the excess slurry is removed and the three-dimensional structure is dried or calcined to thereby obtain a catalyst; (2) a method in which the slurries a, b and c are prepared in the same manner as in (1) above, after the region containing palladium and yttrium is formed, the slurry c is brought into contact with a portion that becomes the second region on the region containing palladium and yttrium, after which the excess slurry is removed and the three-dimensional structure is dried or calcined, and subsequently the slurry b is brought into contact with a portion that becomes the first region on the region containing palladium and yttrium, after which the excess slurry is removed and the three-dimensional structure is dried or calcined to thereby obtain a catalyst; and (3) a method in which a slurry d containing a component specific to the region containing palladium and yttrium, a slurry e containing a component specific to the first region, a slurry f containing a component specific to the second region, and a solution containing a component common to each of the regions are prepared, the slurry d is brought into contact with a three-dimensional structure, after which the excess slurry is removed and the three-dimensional structure is dried or calcined, subsequently the slurry e is brought into contact with a portion that becomes the first region, after which the excess slurry is removed and the three-dimensional structure is dried or calcined, subsequently the slurry f is brought into contact with a portion that becomes the second region, after which the excess slurry is removed and the three-dimensional structure is dried or calcined, and finally, the three-dimensional structure after calcination is impregnated with the solution and then is dried or calcined to thereby obtain a catalyst.

The drying temperature is preferably from room temperature to approximately 150° C., and the calcining temperature is preferably from approximately 150 to 600° C. The drying and calcining conditions can be changed as appropriate in accordance with the target object.

Examples of methods for producing the slurries a to f include (1) a method in which powders of each component are wet milled to form a slurry; (2) a method in which the powder of a certain component is impregnated with a liquid (precursor) of another component and then dried or calcined to obtain a mixed powder and the mixed powder is then wet milled to form a slurry; and (3) a method in which a liquid (precursor) of another component is mixed into a powder of a certain component and the mixture was then wet milled to form a slurry. Alternatively, when the powder is a fine powder, a slurry can be produced by mixing the fine powder with an appropriate medium.

Exhaust Gas Purification Method

The exhaust gas to be subjected to the exhaust gas purification method according to an embodiment of the present invention is not particularly limited as long as it is an exhaust gas discharged from an internal combustion engine such as a gasoline engine, a diesel engine, or a gas turbine, but exhaust gas discharged from a gasoline engine is more preferable. Bringing the exhaust gas purification catalyst according to an embodiment of the present invention into contact with exhaust gas discharged from an internal combustion engine can purify the hydrocarbons (HC), carbon monoxide (CO), and nitrogen oxides (NOx) in the exhaust gas. In particular, while the exhaust gas purification catalyst according to an embodiment of the present invention is capable of more effectively purifying the exhaust gas when the temperature of the exhaust gas is higher than 500° C., even if the exhaust gas is preferably not greater than 500° C., more preferably not greater than 400° C., and even more preferably not greater than 350° C., the purification rate of the exhaust gas can reach not less than 50%. Here, when the time for the purification rate of the exhaust gas to reach 50% is considered to be T50, as the time (light-off time) to reach T50 becomes shorter, the exhaust gas is purified more quickly.

In addition, the exhaust gas purification catalyst according to an embodiment of the present invention can effectively purify exhaust gas even when the space velocity of the exhaust gas is preferably not less than 80000 $h^{-1}$, more preferably not less than 100000 and even more preferably not less than 120000 $h^{-1}$. The upper limit of the space velocity of the exhaust gas depends on the displacement of the engine or other internal combustion engine, but an upper limit of not greater than 500000 $h^{-1}$ is preferable.

Furthermore, even when exposed to exhaust gas at temperatures of 800 to 1000° C. for 40 to 450 hours, the exhaust gas purification catalyst is effective and can purify HC, CO, and NOx in the exhaust gas, and therefore the exhaust gas purification catalyst can purify NOx for a long period of time and is durable.

SUMMARY

As described above, the present invention includes the invention described in (1) to (14) below.

(1) An exhaust gas purification catalyst including: a region containing palladium and yttrium, the region being provided on a three-dimensional structure; and a first region and a second region being provided on the region containing palladium and yttrium in order from an inflow side of exhaust gas to an outflow side of exhaust gas, wherein the concentration of yttrium contained in either the first region and/or the second region is higher than the concentration of yttrium contained in the region containing palladium and yttrium.

(2) The exhaust gas purification catalyst according to (1), wherein the concentration of yttrium contained in the second region is from 2 mass % to 15 mass % in terms of $Y_2O_3$, and the concentration of yttrium contained in the region containing palladium and yttrium is from 0.01 mass % to 0.9 mass % in terms of $Y_2O_3$.

(3) The exhaust gas purification catalyst according to (1) or (2), wherein the amount of yttrium contained in the second region is larger than the amount of yttrium contained in the first region.

(4) The exhaust gas purification catalyst according to any one of (1) to (3), wherein the amount of yttrium contained in the second region is from 2.1 g/L to 10 g/L in terms of $Y_2O_3$ relative to 1 liter of the three-dimensional structure, and the amount of yttrium contained in the region containing palladium and yttrium is from 0.01 g/L to 0.7 g/L in terms of $Y_2O_3$ relative to 1 liter of the three-dimensional structure.

(5) The exhaust gas purification catalyst according to any one of (1) to (4), wherein the yttrium-containing complex oxide (2) contained in the second region has a higher yttrium ratio than the yttrium-containing complex oxide (3) contained in the region containing palladium and yttrium.

(6) The exhaust gas purification catalyst according to any one of (1) to (5), wherein the ratio of yttrium in the yttrium-containing complex oxide (2) contained in the second region is from 8 mass % to 20 mass % in terms of $Y_2O_3$, and the ratio of yttrium in the yttrium-containing complex oxide (3) contained in the region containing palladium and yttrium is from 0.01 mass % to 7 mass % in terms of $Y_2O_3$.

(7) The exhaust gas purification catalyst according to any one of (1) to (6), wherein the concentration of rhodium contained in the first region is higher than the concentration of rhodium contained in the second region.

(8) The exhaust gas purification catalyst according to any one of (1) to (7), wherein the concentration of palladium contained in the region containing palladium and yttrium is from 3 mass % to 10 mass %, the concentration of rhodium contained in the first region is from 0.9 mass % to 5 mass %, and the concentration of rhodium contained in the second region is from 0.1 mass % to 0.8 mass %.

(9) The exhaust gas purification catalyst according to any one of (1) to (8), wherein the amount of palladium contained in the region containing palladium and yttrium is from 0.1 g/L to 15 g/L in terms of metal relative to 1 liter of the three-dimensional structure, the amount of rhodium contained in the first region is from 0.4 g/L to 1.2 g/L in terms of metal relative to 1 liter of the three-dimensional structure, and the amount of rhodium contained in the second region is not less than 0.1 g/L and less than 0.4 g/L in terms of metal relative to 1 liter of the three-dimensional structure.

(10) The exhaust gas purification catalyst according to any one of (1) to (9), wherein the amount of all components provided in each region is larger in the region containing palladium and yttrium than in the second region and is larger in the second region than in the first region, the amount of all components provided in the region containing palladium and yttrium is from 70 g/L to 150 g/L, the amount of all components provided in the first region is not less than 21 g/L and less than 40 g/L, and the amount of all components provided in the second region is not less than 40 g/L and less than 70 g/L relative to 1 liter of the three-dimensional structure.

(11) The exhaust gas purification catalyst according to any one of (1) to (10), wherein the three-dimensional structure is from 30 mm to 200 mm, the region containing palladium and yttrium is from 60% to 100% relative to a length of the three-dimensional structure, the first region is from 20 mm to 50 mm, and the second region is provided on the region containing palladium and yttrium, at a portion where the first region is not provided at the outflow side of exhaust gas.

(12) A method for purifying exhaust gas, comprising purifying exhaust gas using the exhaust gas purification catalyst described in any one of (1) to (11).

(13) The method for purifying exhaust gas according to (12), wherein exhaust gas having a temperature of 100° C. to 500° C. is purified.

(14) The method for purifying exhaust gas according to (12) or (13), wherein exhaust gas having a space velocity of not less than 80000 $h^{-1}$ is purified.

EXAMPLES

The present invention will be described in further detail hereinafter using examples and comparative examples, but the present invention should not be construed as being limited to these examples.

Example 1

Region Containing Palladium and Yttrium

An aqueous solution containing palladium was mixed with an oxide containing aluminum (97 mass % in terms of $Al_2O_3$), barium oxide, and an oxide containing yttrium (the yttrium content was 2 mass % in terms of $Y_2O_3$, also containing cerium, zirconium, and lanthanum), and the mixture was then dried and calcined to obtain a powder. Water was then added to this powder, and the mixture was wet milled to obtain a slurry for forming a region containing palladium and yttrium. Next, a honeycomb (three-dimensional structure) made of cordierite with a length of 80 mm was immersed in the slurry, after which the excess slurry was removed, the honeycomb was dried and calcined, and thereby a region containing palladium and yttrium was provided on the honeycomb. Per liter of the honeycomb, the amount of palladium was 5 g, the amount of zirconium in terms of zirconium oxide ($ZrO_2$) was 15 g, the amount of aluminum in terms of aluminum oxide ($Al_2O_3$) was 43 g, the amount of yttrium in terms of yttrium oxide ($Y_2O_3$) was 0.5 g, the amount of cerium in terms of cerium oxide ($CeO_2$) was 15 g/L, the amount of barium in terms of BaO was 9 g, and the amount of lanthanum in terms of $La_2O_3$ was 7 g. The concentration of palladium in the region was 5.3 mass %, and the concentration of yttrium was mass 0.5%. A total amount of 94.5 g of components per liter of the three-dimensional structure was provided in the region.

First Region

Next, an aqueous solution containing rhodium was mixed with lanthanum oxide, an oxide containing zirconium (containing 73 mass % of zirconium in terms of $ZrO_2$), and an oxide containing aluminum (containing 97 mass % of aluminum in terms of $Al_2O_3$), and the mixture was then dried and calcined to obtain a powder. Water was then added to this powder, and the mixture was wet milled to obtain a slurry for forming the first region. Next, the honeycomb provided with the region containing palladium and yttrium was immersed in the slurry for forming the first region from one end thereof to a predetermined position (the position that becomes the boundary with the second region), then the excess slurry was removed, the honeycomb was dried and calcined, and thereby a first region was provided on the region containing palladium and yttrium, from the exhaust gas inlet side of the honeycomb to a length of 30 mm. Per liter of honeycomb, the amount of rhodium was 0.6 g, the amount of lanthanum in terms of $La_2O_3$ was 3 g, the amount of zirconium in terms of zirconium oxide ($ZrO_2$) was 10 g, and the amount of aluminum in terms of aluminum oxide ($Al_2O_3$) was 14 g. The concentration of yttrium (in terms of $Y_2O_3$) in the region was 0 mass %, and the rhodium concentration was 2.2 mass %. The region was provided with a total amount of 27.6 g of components per liter of the three-dimensional structure.

Second Region

Next, an aqueous solution containing rhodium was mixed with lanthanum oxide, an oxide containing aluminum (containing 97 mass % of aluminum in terms of $Al_2O_3$), and an oxide containing yttrium (the yttrium content was 13 mass % in terms of $Y_2O_3$, also containing zirconium, and lanthanum), and the mixture was then dried and calcined to obtain a powder. Water was then added to this powder, and the mixture was wet milled to obtain a slurry for forming the second region. Next, the honeycomb provided with the first region was immersed in the slurry for forming the second region from the other end to a predetermined position (the position that becomes the boundary with the first region), then the excess slurry was removed, the honeycomb was dried and calcined, and thereby a second region was provided on the region containing palladium and yttrium, from the exhaust gas outlet side to a length of 50 mm. Per liter of the honeycomb, the amount of rhodium was 0.3 g, the amount of lanthanum in terms of $La_2O_3$ was 6 g, the amount of zirconium in terms of zirconium oxide ($ZrO_2$) was 13 g, the amount of aluminum in terms of aluminum oxide ($Al_2O_3$) was 23 g, and the amount of yttrium in terms of yttrium oxide ($Y_2O_3$) was 3 g. The concentration of yttrium (in terms of $Y_2O_3$) in the region was 6.6 mass %, and the rhodium concentration was 0.7 mass %. A total amount of 45.3 g of components per liter of the three-dimensional structure was provided in the region.

Through this, an exhaust gas purification catalyst A was prepared. The schematic configuration of the exhaust gas purification catalyst A is illustrated in FIG. 1.

As illustrated in FIG. 1, an exhaust gas purification catalyst A of the present example had a structure in which a region 2 containing palladium and yttrium was provided on a honeycomb 1 made of cordierite and in which a first region 3 and a second region 4 were provided on the region 2 containing palladium and yttrium in order from an inflow side of exhaust gas to an outflow side.

Comparative Example 1

Region Containing Palladium and Yttrium

An aqueous solution containing palladium was mixed with barium oxide, an oxide containing aluminum, and an oxide containing yttrium (the yttrium content was 2 mass % in terms of $Y_2O_3$, also containing cerium, zirconium, and lanthanum), and the mixture was then dried and calcined to obtain a powder. Water was then added to this powder, and the mixture was wet milled to obtain a slurry for forming a region containing palladium and yttrium. Next, a honeycomb made of cordierite with a length of 80 mm was immersed in the slurry, after which the excess slurry was removed, the honeycomb was dried and calcined, and thereby a region containing palladium and yttrium was provided on the honeycomb. In the region, per liter of the honeycomb, the amount of palladium was 5 g, the amount of cerium in terms of cerium oxide ($CeO_2$) was 20 g, the amount of zirconium in terms of zirconium oxide ($ZrO_2$) was 20 g, the amount of aluminum in terms of aluminum oxide ($Al_2O_3$) was 58 g, the amount of lanthanum in terms of lanthanum oxide ($La_2O_3$) was 10 g, and the amount of yttrium in terms of yttrium oxide ($Y_2O_3$) was 0.7 g. The concentration of palladium in the region was 4.4 mass %, and the concentration of yttrium (in terms of $Y_2O_3$) was 0.6 mass %. A total amount of 113.7 g of components per liter of the three-dimensional structure was provided in the region.

Surface Region

Next, an aqueous solution containing rhodium was mixed with lanthanum oxide, an oxide containing aluminum, and an oxide containing yttrium (the yttrium content was 13 mass % in terms of $Y_2O_3$, also containing cerium, zirconium, and lanthanum), and the mixture was then dried and calcined to obtain a powder. Water was then added to this powder, and the mixture was wet milled to obtain a slurry for forming a surface region. Next, the honeycomb provided with the region containing palladium and yttrium was immersed in the slurry for forming the surface region, then the excess slurry was removed, the honeycomb was dried and calcined, and thereby a surface region was provided on the region containing palladium and yttrium. In this surface region, per liter of the honeycomb, the amount of rhodium was 0.6 g, the amount of zirconium in terms of zirconium oxide ($ZrO_2$) was 20 g, the amount of aluminum in terms of aluminum oxide ($Al_2O_3$) was 37 g, the amount of lanthanum in terms of lanthanum oxide ($La_2O_3$) was 10 g, and the amount of yttrium in terms of yttrium oxide ($Y_2O_3$) was 4.4 g. The concentration of yttrium (in terms of $Y_2O_3$) in the region was 6.1 mass %. A total amount of 72 g of components per liter of the three-dimensional structure was provided in the region.

Through this, an exhaust gas purification catalyst B was prepared for comparison. A schematic configuration of the exhaust gas purification catalyst B is illustrated in FIG. 2.

Figure 2:
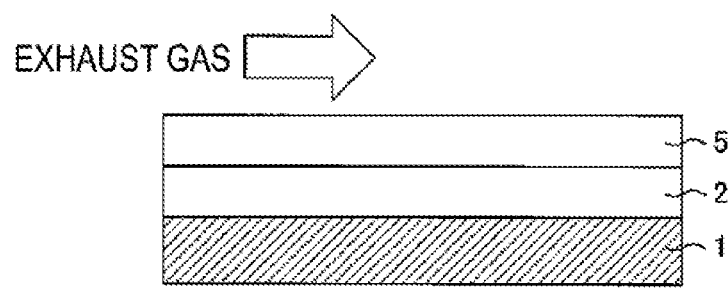
FIG. 2 is a cross section view illustrating a schematic configuration of a known exhaust gas purification catalyst (Comparative Example 1).

As illustrated in FIG. 2, the exhaust gas purification catalyst B of the comparative example had a structure in which the region 2 containing palladium and yttrium was provided on the honeycomb 1 made of cordierite, and a surface region 5 was provided on the region 2 containing palladium and yttrium.

Catalyst Evaluation

The exhaust gas purification catalysts A and B prepared in Example 1 and Comparative Example 1 were separately installed in an exhaust pipe of a gasoline engine for which an air/fuel (A/F) oscillation control according to the stoichiometric ratio A/F was performed. Furthermore, the exhaust gas purification catalysts A and B were exposed to exhaust gas having a temperature of 1000° C. for 80 hours, after which the temperature of the exhaust gas was maintained at 100° C., the temperature of the exhaust gas was increased, and the temperatures at which the purification rates of HC, CO, and NOx reached 50% were measured. The results are shown in Table 1. With the catalyst having the configuration of the present invention, the temperature at which the conversion ratio reached 50% was lower than that of the catalyst not having the first region and the second region, and the catalyst of the present invention exhibited superior low-temperature activity.

TABLE 1

|  | T50 | | |
| --- | --- | --- | --- |
|  | CO (° C.) | THC (° C.) | NOx (° C.) |
| EXAMPLE 1 | 382 | 384 | 356 |
| COMPARATIVE EXAMPLE 1 | 392 | 392 | 369 |

INDUSTRIAL APPLICABILITY

The exhaust gas purification catalyst and the exhaust gas purification method using the catalyst according to the present invention can be suitably used in the purification of exhaust gas discharged from an internal combustion engine such as a gasoline engine, a diesel engine, and a gas turbine.

REFERENCE SIGNS LIST

1 Honeycomb (three-dimensional structure)
2 Region containing palladium and yttrium
3 First region
4 Second region
5 Surface region

The invention claimed is:

1. An exhaust gas purification catalyst comprising:
a region containing palladium and yttrium, the region being provided on a three-dimensional structure; and
a first region and a second region being provided on the region containing palladium and yttrium in order from an inflow side of exhaust gas to an outflow side of exhaust gas, wherein
the concentration of yttrium contained in either the first region and/or the second region is higher than the concentration of yttrium contained in the region containing palladium and yttrium,
the concentration of yttrium contained in the second region is from 2 mass % to 15 mass % in terms of $Y_2O_3$, and
the concentration of yttrium contained in the region containing palladium and yttrium is from 0.01 mass % to 0.9 mass % in terms of $Y_2O_3$.

2. The exhaust gas purification catalyst according to claim 1,
wherein the amount of yttrium contained in the second region is larger than the amount of yttrium contained in the first region.

3. The exhaust gas purification catalyst according to claim 1, wherein the amount of yttrium contained in the second region is from 2.1 g/L to 10 g/L in terms of $Y_2O_3$ relative to 1 liter of the three-dimensional structure, and
the amount of yttrium contained in the region containing palladium and yttrium is from 0.01 g/L to 0.7 g/L in terms of $Y_2O_3$ relative to 1 liter of the three-dimensional structure.

4. The exhaust gas purification catalyst according to claim 1, wherein the yttrium-containing complex oxide (2) contained in the second region has a higher yttrium ratio than the yttrium-containing complex oxide (3) contained in the region containing the palladium and yttrium.

5. The exhaust gas purification catalyst according to claim 1, wherein the ratio of yttrium in the yttrium-containing complex oxide (2) contained in the second region is from 8 mass % to 20 mass % in terms of $Y_2O_3$, and
the ratio of yttrium in the yttrium-containing complex oxide (3) contained in the region containing palladium and yttrium is from 0.01 mass % to 7 mass % in terms of $Y_2O_3$.

6. The exhaust gas purification catalyst according to claim 1, wherein the first region and the second region further comprise rhodium, and the concentration of rhodium contained in the first region is higher than the concentration of rhodium contained in the second region.

7. The exhaust gas purification catalyst according to claim 1, wherein the first region and the second region further comprise rhodium,
the concentration of palladium contained in the region containing palladium and yttrium is from 3 mass % to 10 mass %,
the concentration of rhodium contained in the first region is from 0.9 mass % to 5 mass %, and
the concentration of rhodium contained in the second region is from 0.1 mass % to 0.8 mass %.

8. The exhaust gas purification catalyst according to claim 1, wherein the first region and the second region further comprise rhodium,
the amount of palladium contained in the region containing palladium and yttrium is from 0.1 g/L to 15 g/L in terms of metal relative to 1 liter of the three-dimensional structure,
the amount of rhodium contained in the first region is from 0.4 g/L to 1.2 g/L in terms of metal relative to 1 liter of the three-dimensional structure, and
the amount of rhodium contained in the second region is not less than 0.1 g/L and less than 0.4 g/L in terms of metal relative to 1 liter of the three-dimensional structure.

9. The exhaust gas purification catalyst according to claim 1, wherein the amount of all components provided in each region is larger in the region containing palladium and yttrium than in the second region and is larger in the second region than in the first region,
the amount of all components provided in the region containing palladium and yttrium is from 70 g/L to 150 g/L, the amount of all components provided in the first region is not less than 21 g/L and less than 40 g/L, and the amount of all components provided in the second region is not less than 40 g/L and less than 70 g/L relative to 1 liter of the three-dimensional structure.

10. The exhaust gas purification catalyst according to claim 1, wherein the three-dimensional structure is from 30 mm to 200 mm, the region containing palladium and yttrium is from 60% to 100% relative to a length of the three-dimensional structure, the first region is from 20 mm to 50 mm, and the second region is provided on the region containing palladium and yttrium, at a portion where the first region is not provided at the outflow side of exhaust gas.

11. A method for purifying exhaust gas, comprising purifying exhaust gas using the exhaust gas purification catalyst according to claim 1.

12. The method for purifying exhaust gas according to claim 11, wherein exhaust gas having a temperature of 100° C. to 500° C. is purified.

13. The method for purifying exhaust gas according to claim 11, wherein exhaust gas having a space velocity of not less than 80000 h$^{-1}$ is purified.

14. An exhaust gas purification catalyst comprising:

a region containing palladium and yttrium, the region being provided on a three-dimensional structure; and a first region and a second region being provided on the region containing palladium and yttrium in order from an inflow side of exhaust gas to an outflow side of exhaust gas, wherein the concentration of yttrium contained in either the first region and/or the second region is higher than the concentration of yttrium contained in the region containing palladium and yttrium, the amount of yttrium contained in the second region is from 2.1 g/L to 10 g/L in terms of $Y_2O_3$ relative to 1 liter of the three-dimensional structure, and the amount of yttrium contained in the region containing palladium and yttrium is from 0.01 g/L to 0.7 g/L in terms of $Y_2O_3$ relative to 1 liter of the three-dimensional structure.

15. An exhaust gas purification catalyst comprising:

a region containing palladium and yttrium, the region being provided on a three-dimensional structure; and a first region and a second region being provided on the region containing palladium and yttrium in order from an inflow side of exhaust gas to an outflow side of exhaust gas, wherein the concentration of yttrium contained in either the first region and/or the second region is higher than the concentration of yttrium contained in the region containing palladium and yttrium, the ratio of yttrium in the yttrium-containing complex oxide (2) contained in the second region is from 8 mass % to 20 mass % in terms of $Y_2O_3$, and the ratio of yttrium in the yttrium-containing complex oxide (3) contained in the region containing palladium and yttrium is from 0.01 mass % to 7 mass % in terms of $Y_2O_3$.

* * * * *